United States Patent
Cole et al.

(10) Patent No.: US 6,475,454 B1
(45) Date of Patent: Nov. 5, 2002

(54) THERMALLY LIMITED SELECTIVE OXIDATION METHODS AND APPARATUS

(75) Inventors: Jerald A. Cole, Long Beach, CA (US); Richard K. Lyon, Pittstown, NJ (US)

(73) Assignee: GE Energy & Environmental Research Corporation, Irvine, CA (US)

( * ) Notice: Subject to any disclaimer, the term of this patent is extended or adjusted under 35 U.S.C. 154(b) by 0 days.

(21) Appl. No.: 09/231,563

(22) Filed: Jan. 14, 1999

(51) Int. Cl.⁷ ............................ B01D 19/00; C01B 3/50
(52) U.S. Cl. ................... 423/246; 423/247; 423/437.2; 423/648.1; 422/198; 422/211; 422/223
(58) Field of Search .................. 423/246, 247, 423/648.1, 658.3, 437.2; 429/17, 19; 422/211, 223, 198

(56) References Cited

U.S. PATENT DOCUMENTS

| | | | |
|---|---|---|---|
| 2,103,220 A | * 12/1937 | Jenness | 423/247 |
| 2,944,627 A | 7/1960 | Skarstrom | 183/4.7 |
| 3,216,783 A | 11/1965 | Cohn | 23/2 |
| 3,380,800 A | * 4/1968 | Marten | 423/247 |
| 3,886,481 A | * 5/1975 | Foster | 330/4.3 |
| 4,238,468 A | 12/1980 | Bonacci et al. | 423/359 |
| 4,650,727 A | 3/1987 | Vanderborgh et al. | 429/19 |
| 4,906,448 A | * 3/1990 | Sauvion et al. | 423/437 |
| 4,991,181 A | * 2/1991 | Upchurch et al. | 372/59 |
| 5,271,916 A | 12/1993 | Vanderborgh et al. | 423/246 |
| 5,316,747 A | 5/1994 | Pow et al. | 423/247 |
| 5,330,727 A | 7/1994 | Trocciola et al. | 422/177 |
| 5,339,754 A | 8/1994 | Lyon | 110/345 |
| 5,432,021 A | 7/1995 | Wilkinson et al. | 429/17 |
| 5,436,086 A | 7/1995 | Seymour et al. | 429/17 |
| 5,456,889 A | 10/1995 | Pow et al. | 422/173.1 |
| 5,509,362 A | 4/1996 | Lyon | 110/345 |
| 5,518,705 A | 5/1996 | Buswell et al. | 423/437 M |
| 5,604,047 A | * 2/1997 | Bellows | 429/19 |
| 5,637,415 A | 6/1997 | Meltser et al. | 429/17 |
| 5,750,076 A | 5/1998 | Buswell et al. | 422/115 |
| 5,827,496 A | 10/1998 | Lyon | 423/659 |
| 5,955,214 A | * 9/1999 | Bellows | 429/17 |
| 5,993,762 A | * 11/1999 | Rajaram et al. | 423/213.2 |
| 6,120,925 A | * 9/2000 | Kawatsu et al. | 429/40 |

FOREIGN PATENT DOCUMENTS

| | | | | |
|---|---|---|---|---|
| JP | 02-144125 | * | 6/1990 | 423/247 |
| JP | 03-208801 | * | 9/1991 | 423/247 |
| JP | 08-188783 | * | 7/1996 | |
| JP | 08-295502 | * | 11/1996 | |

OTHER PUBLICATIONS

Oh and Sinkevitch, Carbon Monoxide Removal from Hydrogen–Rich Fuel Cell Feedstreams by Selective Catalytic Oxidation, Journal of Catalysis, vol. 142, pp. 254–262, Jul. 1993.

Watanabe et al. Pt. Catalyst Supported on Zeolite for Selective Oxidation of CO in Reformed Gases, Chemistry Letters, pp. 21–22, Jan. 1995.

(List continued on next page.)

Primary Examiner—Stanley S. Silverman
Assistant Examiner—Timothy C. Vanoy
(74) Attorney, Agent, or Firm—Workman Nydegger Seeley (57) ABSTRACT

A method and apparatus are provided for selectively oxidizing carbon monoxide in the presence of hydrogen gas while leaving the hydrogen substantially unoxidized. This method utilizes a catalytic material, such as copper/copper oxide, silver/silver oxide, nickel/nickel oxide, and the higher and lower oxides of cerium, which in a more oxidized state is readily reduced by carbon monoxide and which in a more reduced state is readily oxidized by air. A carbon monoxide/hydrogen gas mixture and air are alternately contacted with the catalytic material, such that the carbon monoxide is selectively oxidized and the catalytic material is regenerated.

22 Claims, 3 Drawing Sheets

OTHER PUBLICATIONS

Igarashi et al., *Removal of Carbon Monoxide from Hydrogen–rich Fuels by Selective Oxidation Over Platinum Catalyst Supported on Zeolite, Applied Catalysis A: General,* vol. 159, pp. 159–169, Oct. 1997.

Sanchez et al., *Selective Oxidation of CO in Hydrogen Over Gold Supported on Manganese Oxides*, Journal of Catalysis, vol. 168, pp. 125–127, May 1997.

Kahlich et al. *Kinetics of the Selective CO Oxidation in $H_2$–Rich Gas on Pt/$Al_2O_3$, Journal of Catalysis,* vol. 171, pp. 93–105, Oct. 1997.

Vanderborgh et al., *Fuel Processing Research & Development Preferential Oxidation, Carbon Monoxide Control During On–Board Fuel Processing, OAAT Fuel Cell Program Review,* Jul. 1997.

Sekizawa et al., *Selective Removal of CO in Methanol Reformed Gas Over Cu–supported Mixed Metal Oxides, Applied Catalysis A: General,* vol. 169, pp. 291–297, May 1998.

* cited by examiner

THERMALLY LIMITED SELECTIVE OXIDATION METHODS AND APPARATUS

BACKGROUND OF THE INVENTION

1. The Field of the Invention

The present invention relates generally to apparatus and methods for purifying a gaseous mixture with a high $H_2(g)$ content so that it can be used safely in fuel cells and other applications without need for further processing. More particularly, the invention is directed to apparatus and methods for selectively oxidizing carbon monoxide in the presence of hydrogen gas, thereby allowing the purified gaseous mixture to be used to power fuel cells.

2. The Relevant Technology

Hydrogen gas can readily be produced by well-known processes such as partial oxidation of a hydrocarbon with air or oxygen, or steam reforming of a hydrocarbon. Historically the major producer of hydrogen gas has been the petrochemical industry, which has also been the major consumer. More recently, however, advances in fuel cell technology have prompted the development of technologies for the production of hydrogen gas suitable for use in fuel cells. These new technologies have included methods of producing and purifying hydrogen on a smaller scale; i.e., on a scale appropriate for fuel cell usage. It is of particular importance, of course, to purify the hydrogen gas of those impurities that adversely affect the performance of the fuel cell.

In fuel cells of the PEM type (polymer electrolyte membrane (PEM), or polymer electrolyte fuel cell (PEFC)), carbon monoxide readily poisons the anode catalyst, even at very low levels. While a carbon monoxide impurity of no greater than about 100 ppm can be tolerated, even a CO concentration of about 5 ppm can have a significant adverse effect on fuel cell performance. Thus, the removal of carbon monoxide from fuel cell gas mixtures down to very low levels (preferably less than about 5 ppm) is of particular importance for PEM fuel cell applications.

The CO content of a hydrogen-containing gas can be substantially reduced by passing the gas through a water gas shift reactor. This well-known purification method, however, is not suitable for removing trace amounts of CO from hydrogen gas mixtures. Further purification can be achieved by two well-known methods: passing the gas through a catalyst to reduce the CO impurity to methane, and selectively oxidizing the CO impurity to $CO_2$.

Each of these known methods has disadvantages. The former method has the disadvantage that three moles of $H_2$ gas are consumed for every mole of CO removed (CO+$3H_2 \rightarrow CH_4 + H_2O$). Moreover, if carbon dioxide is also present in the gas mixture, it may also be reduced to methane and water, at a cost of four moles of $H_2$ gas per mole of carbon dioxide removed.

In selective oxidation as taught by the prior art, air (or oxygen) is added to the hydrogen gas mixture. The amount of air (or oxygen) added is equal to or greater than that which is stoichiometrically required for complete oxidation of the carbon monoxide impurity. The resulting mixture is then passed through a reactor containing a noble metal catalyst at an accurately controlled temperature to oxidize the carbon monoxide to carbon dioxide, while only a small portion of the hydrogen gas is oxidized.

For example, U.S. Pat. No. 3,216,783 discloses a process for the selective oxidation of carbon monoxide in hydrogen-rich gas mixtures by contacting the gas mixture with a supported platinum catalyst in the presence of oxygen. More recent work has focused on improving various aspects of the selective CO oxidation technology. Thus, U.S. Pat. No. 5,271,916 discloses a method of operating an $H_2$—$O_2$ fuel cell which includes, in part, catalytically oxidizing CO in a hydrogen-rich feed stream in two stages. The feed stream is first mixed with a predetermined quantity of oxygen, and the CO is oxidized at a first temperature on a first catalyst. The output stream is then mixed with a second predetermined quantity of oxygen, and the CO is oxidized at a second temperature on a second catalyst. The use of a dual-stage method reportedly produces a hydrogen-rich stream having less than 0.01% CO, without substantial reaction of the hydrogen.

Other references disclose methods of oxidizing CO using two air or oxygen streams (e.g., U.S. Pat. No. 5,432,021), two catalytic stages (e.g., U.S. Pat. Nos. 5,330,727 and 5,456,889), and various types of temperature control (e.g., U.S. Pat. Nos. 5,456,889 and 5,518,705) and/or oxygen-containing gas flow control (e.g., U.S. Pat. No. 5,637,415). Still other references attempt to optimize the CO oxidation selectivity and other factors using different catalyst systems, such as alumina-supported ruthenium or rhodium (Oh and Sinkevitch, *Journal of Catalysis*, 142, 254–262, (1993)); zeolite-supported platinum (Watanabe et. al., *Applied Catalysis A: General*, 159, 159–169 (1997) and Watanabe et. al., *Chemistry Letters*, 21–22 (1995)); gold supported on manganese oxides (Haruta et. al., *Journal of Catalysis*, 168, 125–127 (1997)); and copper supported on alumina-based mixed metal oxides (Eguchi et al., *Applied Catalysis A: General*, 169, 291–297 (1998)).

All of these references, however, are subject to important disadvantages inherent in conventional methods of catalyzed CO oxidation in hydrogen-rich gas mixtures. One of these disadvantages relates to the control of the temperature within the reactor. Accurate temperature control is necessary to promote complete and selective CO oxidation. If the temperature is too low, the oxidation is slow, and carbon monoxide can escape the reactor unoxidized. If the temperature is too high, the oxidation is rapid but unselective: too much of the added oxygen is consumed by reaction with the hydrogen gas, and again carbon monoxide can escape the reactor unoxidized. Although critical, accurate temperature control is difficult to achieve. The oxidation of carbon monoxide is strongly exothermic ($\Delta H = -68.6$ kcal/mol CO), and the full heat of the CO oxidation reaction is liberated within the reactor, making control of the reaction temperature a matter of some difficulty.

A second disadvantage of these conventional methods is that they teach that air (or other oxygen-containing gas) is to be mixed with the hydrogen-rich gas, to provide the necessary oxygen for CO oxidation. While the amount of oxygen added is too small for the final mixture to be flammable, during the mixing process the mixture passes through a composition state which is not merely flammable but is potentially explosive. Although the amount of gaseous mixture in this hazardous condition may be relatively small when the system is operating normally, it may become much larger during a malfunction. Thus, use of these conventional methods raises serious safety concerns.

Thus, there is a need for a method which overcomes the disadvantages of the prior art while still allowing selective removal of carbon monoxide from hydrogen gas mixtures.

SUMMARY AND OBJECTS OF THE INVENTION

A principal object of the present invention is to improve the purification of gases having a high hydrogen gas content by providing a novel process and reactor system in which carbon monoxide can be selectively oxidized in the presence of hydrogen without significant oxidation of the hydrogen taking place.

A further object of the present invention is to minimize the problems of temperature control, which occur when carbon monoxide is oxidized, by performing the oxidation in such a manner that only a fraction of the heat of oxidation is released into the reactor.

Still another object of the present invention is to perform the selective oxidation of carbon monoxide without creating a potentially hazardous hydrogen-oxygen gas mixture.

To achieve the foregoing objects, and in accordance with the invention as embodied and broadly described herein, methods and apparatus have been developed for selectively oxidizing carbon monoxide in a gas mixture containing hydrogen gas without the necessity of mixing air into the gas. This is accomplished by alternately (1) contacting the gas mixture with an oxygen transfer catalyst in an oxidized state to oxidize the carbon monoxide in the gas mixture to carbon dioxide and reduce the oxygen transfer catalyst to a reduced state; and (2) reoxidizing the oxygen transfer catalyst by contacting it with an oxygen-containing gas, such as air. The method is conveniently carried out at a temperature at which the CO oxidation proceeds relatively rapidly, but the undesired oxidation of hydrogen gas proceeds relatively slowly, or not at all.

These and other objects, features, and advantages of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not, therefore, to be considered limiting of its scope, the invention will be described and explained with additional specificity and detail through the use of the accompanying drawings in which.

DETAILED DESCRIPTION OF THE INVENTION

The present invention relates to methods and apparatus for effectively reducing the concentration of carbon monoxide in a hydrogen-rich gas mixture. In accordance with the invention, carbon monoxide in a hydrogen-rich gas mixture is removed to very low levels. The resulting purified gas mixture is suitable for use as a fuel in fuel cells and other devices incompatible with carbon monoxide. Such devices include, for example, those in which carbon monoxide acts as a "poison" which renders the device ineffective for its intended purpose. The present invention advantageously removes or eliminates carbon monoxide from the hydrogen gas mixture without the need for mixing air or oxygen and the hydrogen gas.

In general, a method for selectively oxidizing carbon monoxide in a hydrogen-containing gas mixture according to one aspect of the invention includes providing a gas mixture with hydrogen gas and carbon monoxide, and providing an oxygen transfer catalyst having an oxidized state and a reduced state. The method of the invention is carried out by alternately performing the steps of: (1) contacting the gas mixture with the oxygen transfer catalyst in the oxidized state so that at least a portion of the carbon monoxide in the gas mixture is oxidized to carbon dioxide, and at least a portion of the oxygen transfer catalyst in the oxidized state is reduced to the reduced state; and (2) reoxidizing the oxygen transfer catalyst in the reduced state to the oxidized state.

The carbon monoxide in the resulting purified gas mixture is present at levels at which the gas mixture is suitable for use in applications, such as PEM fuel cell applications, requiring hydrogen gas substantially free of carbon monoxide impurities. Further details related to the methods of the invention are discussed below.

The gas mixture utilized in the method of the invention includes carbon monoxide and hydrogen gas, but may also include other gases such as nitrogen, water vapor and carbon dioxide. Preferably, the amount of carbon monoxide in the gas mixture is relatively small, e.g., less than about 5% by volume. Although the present invention provides a method for selectively oxidizing carbon monoxide without releasing the full heat of reaction into the reaction system, the use of higher concentrations of CO presents temperature control problems and is not preferred. The method of the present invention is particularly well suited for purifying gas mixtures containing small, but detrimental, amounts of CO. Thus, the concentration of CO is preferably less than about 2% by volume, more preferably less than about 1%, and still more preferably less than about 0.5%. The amount of hydrogen gas in the gas mixture is not particularly limited, since it is the small amount of CO which reacts, and the $H_2$ passes through the reaction system with little or no oxidation. To provide gas mixtures suitable for use with PEM fuel cells, it is preferred to use a starting gas mixture containing at least about 20% by volume $H_2$, preferably at least about 50% $H_2$, and more preferably at least about 80% $H_2$.

The oxygen transfer catalyst utilized in the method of the invention is a material having at least two forms, or states: an oxidized state and a reduced state. In the oxidized state, the oxygen transfer catalyst contains oxygen which can be used to oxidize CO. Thus, the oxidized state of suitable catalysts is one which, upon contact with CO and $H_2$ at an appropriate temperature, preferentially oxidizes the CO to $CO_2$ more readily than it oxidizes $H_2$. In the reduced state, a suitable oxygen transfer catalyst can be oxidized by contact with an oxygen-containing gas, such as air. The oxidized state and the reduced state of the oxygen transfer catalyst are reversibly linked, so that upon contact with CO, the oxygen transfer catalyst in the oxidized state oxidizes CO and is thereby reduced to the reduced state. Similarly, upon contact with an oxygen-containing gas, the oxygen transfer catalyst in the reduced state is oxidized to the oxidized state. Although not previously known to selectively oxidize CO in a hydrogen-containing gas, such oxygen transfer catalysts are known, and are described in, for example, U.S. Pat. Nos. 5,339,754 and 5,509,362, the disclosures of which are incorporated herein by reference in their entirety.

Oxygen transfer catalysts are a type of mass transfer catalyst. Mass transfer catalysis should be considered in contrast to conventional chemical catalysis. In conventional chemical catalysis, the catalyst is believed to alter the reaction pathway by providing an alternative reaction mechanism that allows the reaction to proceed more rapidly and/or with greater selectivity. Typically, although the chemical catalyst takes part in the reaction, it is present in relatively small amounts. The use of small amounts is possible because the catalyst is not consumed as a reagent in the reaction. Ideally, the catalyst is present in the same amount, and in the same form, at the beginning and end of the reaction. Indeed, one common reference defines a "catalyst" as "any substance of which a small proportion notably affects the rate of a chemical reaction without itself being consumed or undergoing a chemical change. " *Hawley's Condensed Chemical Dictionary,* 12th ed (1993). Typical of such catalysts for oxidation reactions are noble metals such as iridium, platinum, palladium, rhodium and rhenium. These noble metals are typically present in noble metal catalysts in extremely small amounts, often 0.01% by weight or less. When a mixture of air and CO is contacted with the catalyst, for example in an automobile catalytic converter, the noble metal catalyzes the oxidation reaction but does not store any significant quantity of oxygen. If at any instant the air supplied is not adequate for complete combustion, the combustion will be incomplete. Thus, the effectiveness of the catalyst to oxidize the exhaust gas ultimately depends upon the proper fuel/air mixture in the gas stream.

In contrast, unlike conventional chemical catalysts, a mass transfer catalyst facilitates the mass transfer of a reactant, an entirely different type of action. In mass transfer catalysis, as used in the present invention, there is no need to present the oxygen transfer catalyst with a mixture of reagents ($O_2$ and CO) at all. Instead, the mass transfer catalyst serves the dual function of catalyzing the reaction (oxidation) and storing a reagent (oxygen), so that the mass transfer catalyst can be exposed to the reagents alternately, rather than simultaneously.

The present invention utilizes such a mass transfer catalyst to oxidize fuel in various combustion systems; i e. the present invention uses an oxygen transfer catalyst.

Non-limiting examples of oxygen transfer catalysts suitable for use in the present invention include copper/copper oxide, silver/silver oxide, nickel/nickel oxide, the higher and lower oxides of iron, the higher and lower oxides of cerium, and combinations or mixtures thereof. One preferred oxygen transfer catalyst for use in the present invention is a copper-copper oxide catalyst. The reduced form of the oxygen transfer catalyst is elemental copper, which is oxidized by contact with an oxygen-containing gas to copper oxide. The oxidized form of the oxygen transfer catalyst is cupric oxide (CuO), which upon contact with CO at an appropriate temperature oxidizes the CO to $CO_2$ and is itself reduced to the reduced form of the catalyst, elemental copper.

Still other suitable oxygen transfer catalysts include the higher and lower oxides of cerium in conjunction with small amounts of a conventional noble metal catalyst such as iridium, platinum, palladium, rhodium, rhenium, and combinations or mixtures thereof. While not wishing to be bound by theory, it is believed that the noble metal catalyst facilitates the transfer of oxygen to and/or from the cerium or cerium oxides. The amount of noble metal catalyst used is not particularly limited, and can be any amount that is a catalytically effective amount. One of skill in the art can readily determine the amount of noble metal catalyst necessary to facilitate reaction. Because of the economic expense of these noble metals, it is preferred to use very small amounts. Suitable amounts are, for example, less than about 1% by weight, preferably less than about 1%, and more preferably less than about 0.01%. Larger amounts are also expected to be suitable, but are preferably avoided because of their cost.

It should be appreciated that oxygen transfer catalysts suitable for the present invention are those catalysts that exhibit the linked oxidized/reduced forms as described above, and are not limited to the specifically recited exemplary compounds. In addition, oxides and other compounds of other elements that do not participate in the mass transfer catalysis reaction may be present. These may include, but are not limited to, materials such as silicon oxide, aluminum oxide, Y-doped zirconium oxide or magnesium oxide, which may act as physical support materials to maintain the active surface area of the mass transfer catalysts.

The oxygen transfer catalysts may be provided in any convenient form as is conventional in the art. Oxygen transfer catalysts are available commercially from various sources, such as the Englehard Corporation of Elyria, Ohio.

It should be appreciated that the oxygen transfer catalyst in the oxidized state generally will not be fully oxidized, but will be a mixture of the oxygen transfer catalyst in the oxidized and reduced states with a substantial portion in the oxidized state. This is simply a matter of convenience, since it is not necessary for the oxygen transfer catalyst to be purely in the oxidized form, since the oxidized and reduced forms are used alternately in the method and are interconverted. Thus, the oxygen transfer catalyst in the oxidized state can be, for example, a mixture of copper and copper oxide, or can be substantially pure copper oxide.

When the gas mixture is contacted with the oxygen transfer catalyst in the oxidized state, carbon monoxide present in the gas mixture is oxidized to produce carbon dioxide, while the oxygen transfer catalyst is reduced to the reduced state. Upon continued contact with carbon monoxide, the oxygen transfer catalyst in the oxidized state becomes depleted by reduction to the reduced state. Thereafter, the oxidized state is regenerated by reoxidizing the oxygen transfer catalyst in the reduced state to the oxidized state. The reoxidation is carried out by contacting the oxygen transfer catalyst with an oxygen-containing gas, such as air. If desired, the reoxidized oxygen transfer catalyst can be contacted with a non-reactive gas, such as nitrogen, argon, steam, etc., before being contacted with air, to ensure that the oxygen-containing gas does not mix with any residual hydrogen-containing gas. Upon contact with air, the reduced state is oxidized to the oxidized state. After the oxygen transfer catalyst is reoxidized so that substantially all of the oxygen transfer catalyst is in the oxidized state, the oxygen transfer catalyst can again be contacted with the hydrogen-containing gas mixture. If desired, the reoxidized oxygen transfer catalyst can be contacted with a non-reactive gas, such as nitrogen, argon, steam, etc., before being contacted with the hydrogen-containing gas mixture.

The steps of reducing and oxidizing the oxygen transfer catalyst are carried out alternately, so that during the reduction of the oxidized state (the oxidation of CO), gaseous $o_2$ is not present, and during the oxidation of the reduced state (regenerating the oxidized state), the hydrogen-containing gas mixture is not present. Thus, the method of the invention advantageously avoids the need to mix together the hydrogen-containing gas and an oxygen containing gas. Further, since the catalyst reoxidizing step is entirely distinct from the step in which CO is oxidized, the heat of reaction generated by the exothermic oxidation of the oxygen transfer catalyst is liberated when the hydrogen-containing gas mixture is not present. The alternate step, in which CO is oxidized and the oxygen transfer catalyst is reduced, is also exothermic, but releases only a fraction of the overall heat of a conventional CO oxidation in which the CO and $O_2$ gases are mixed.

It will be apparent that the appropriate time to switch from the CO oxidizing step to the oxygen transfer catalyst reoxidation (regeneration) step is determined by the decreasing effectiveness of the catalyst. That is, as the oxidized state of the catalyst is depleted, and more of the reduced state is formed, the catalyst will be less effective at selectively oxidizing the CO. One skilled in the art can readily determine such appropriate time in any convenient manner. For example, the position of the reaction front through the oxygen transfer catalyst can be monitored by conventional techniques, such as by monitoring temperature, paramagnetism, or dielectric constant. Alternatively, the CO concentration of the gas mixture after contact with the oxygen transfer catalyst can be monitored by conventional techniques. Similar methods can be used to monitor the progress of the reverse reaction, the reoxidation of the oxygen transfer catalyst. Such methods are entirely conventional, and one skilled in the art can choose the times for changing between the alternate steps based on convenience and reaction efficiency.

It is well-known in the art that selective catalytic oxidation of CO in the presence of $H_2$ is best accomplished at temperatures at which the CO oxidation proceeds rapidly, but the undesired competing reaction of $H_2$ oxidation proceeds slowly. It has surprisingly been discovered that oxygen transfer catalysts at the proper temperature will selectively oxidize CO more rapidly than $H_2$. This result is surprising, since one would expect that the more reactive $H_2$ would be oxidized first, or at least at a significant rate, so that selective oxidation of CO without substantial oxidation of $H_2$ would not occur.

Since the oxidation is carried out catalytically, the optimal reaction temperature depends upon the specific catalyst used, and its physical form. In general, such optimal temperatures are determined empirically. Whether a particular temperature is suitable or not for the practice of the present invention depends upon the absolute rate of oxidation of CO, as well as the relative rates of CO versus $H_2$ oxidation. One skilled in the art of chemical catalysis can readily determine the optimal temperature for a particular catalytic system using well-known techniques.

For a copper/copper oxide catalyst system, CO is preferentially oxidized even at temperature as low as about 40° C. (See Examples, infra.) At such low temperatures, however, the reaction is inconveniently slow. At the high temperatures typically used in conventional oxygen transfer catalysis, $H_2$ is oxidized, and the reaction loses its selectivity.

A convenient measure of preferred temperatures for the present method is the "ignition temperature" which as used herein means the temperature at which a rapid increase in the rate of reaction is observed. Since the CO oxidation reaction is exothermic, the rate of increase in the temperature of the reaction system is correlated to the rate of reaction. The ignition temperature is conveniently determined by, for example, monitoring the reaction temperature as a function of time, for gas mixtures supplied to the oxygen transfer catalyst at different initial temperatures. Specific examples of determining the ignition temperature for particular reaction systems are given in the Examples below.

It is preferred to run the reaction at or above the ignition temperature, since the oxidation of CO at temperatures below the ignition temperature is inconveniently slow. At higher temperatures, an ignition temperature for $H_2$ oxidation may be encountered, resulting in loss of selectivity. Even if no $H_2$ ignition temperature is observed, it is expected that selectivity for CO oxidation will decrease at high enough temperatures. Thus, the preferred temperature range for each catalyst system is the range of temperatures in which the CO is oxidized at an acceptable rate, but selectivity is retained. Depending upon the source of the hydrogen-containing gas mixture, the gas mixture may need to be heated or cooled to the desired temperature. If desired, the oxygen transfer catalyst may also be heated or cooled to a desired temperature.

For a copper/copper oxide catalyst, ignition temperatures for both CO and $H_2$ are observed, as described in the Examples. Thus, the preferred temperature is the range from the ignition temperature of CO to the ignition temperature of $H_2$.

The Examples below show the appropriate temperature range for the Cu/CuO catalyst as about 172° C. However, these temperature values are strongly dependent upon the way in which temperature is measured. For example, depending upon the method of measuring temperature, the temperature may indicate the true gas temperature, the temperature of the oxygen transfer catalyst, the temperature of the walls of a reaction vessel, or a complex function of these and other temperatures. One skilled in the art will readily understand that the actual numerical value of the temperature is not particularly important, and may be measured in any convenient way. The proper temperature for carrying out the method of the present invention, however such temperature is measured, is readily determined by optimizing the balance between CO oxidation rate and reaction selectivity, as described herein.

When using an iron/iron oxides oxygen transfer catalyst in the method of the invention, hydrogen gas is not oxidized at any temperature. The lower limit of reaction temperature is thus simply determined by the rate of CO oxidation. When the temperature is increased, at some point the CO oxidation efficiency will begin to decrease, as the CO fails to interact effectively with the catalyst. One skilled in the art can readily determine the appropriate temperature range.

When using a silver/silver oxide oxygen transfer catalyst, the silver oxide decomposes at higher temperatures. In fact, the temperature where silver oxide begins to show significant decomposition is close to the ignition temperature of CO. At higher temperatures, decomposition of the silver oxide releases oxygen gas, and leaves elemental silver. The combination of $O_2$ gas and silver metal is well suited for catalytic oxidation in the conventional chemical sense, and will efficiently oxidize CO and $H_2$ with little or no selectivity. Thus, when a silver/silver oxide oxygen transfer catalyst is used, the preferred temperature is below the decomposition temperature of the silver oxide.

Similar considerations and determinations will readily lead to the appropriate temperature range for nickel/nickel oxide, cerium/cerium oxide/noble metal, and other catalytic systems.

The method of the present invention may be carried out at atmospheric pressure, or at higher pressures if desired. Typical reaction pressures are from about 1 to about 10 atmospheres, but the invention is not limited to this range. Likewise, the method of the present invention can be carried out at a convenient space velocity determined by reaction efficiency. When the space velocity is too great, of course, some of the CO will fail to be oxidized. Preferably, the space velocity will be at least about 1000 v/v/hr, and can be considerably higher.

If desired, the oxygen transfer catalyst can be provided on a support such as a porous ceramic support. Such catalyst supports are well known in the art. Preferred porous ceramic supports include alumina, magnesia, and mixtures thereof. A preferred support for use in the present invention is alumina.

In another aspect of the present invention, an apparatus for the selective oxidation of carbon monoxide in a hydrogen-containing gas mixture is provided. The apparatus includes means for contacting a gas mixture containing hydrogen gas and carbon monoxide with an oxygen transfer catalyst in an oxidized state, such that at least a portion of the carbon monoxide in the gas mixture is oxidized to carbon dioxide without substantial oxidation of the hydrogen gas, and at least a portion of the oxygen transfer catalyst in the oxidized state is reduced to a reduced state. The apparatus also includes means for reoxidizing the oxygen transfer catalyst in the reduced state to the oxidized state. Nonlimiting examples of various structures which perform these functions are set forth in the embodiments described below and illustrated in the figures.

For illustrative purposes, the apparatus for carrying out the method of the invention as set forth below includes specific embodiments which utilize packed bed reactors. It should be understood that the teachings of the present invention can, however, be applied to any system regardless of the reactor configuration.

Figure 1:
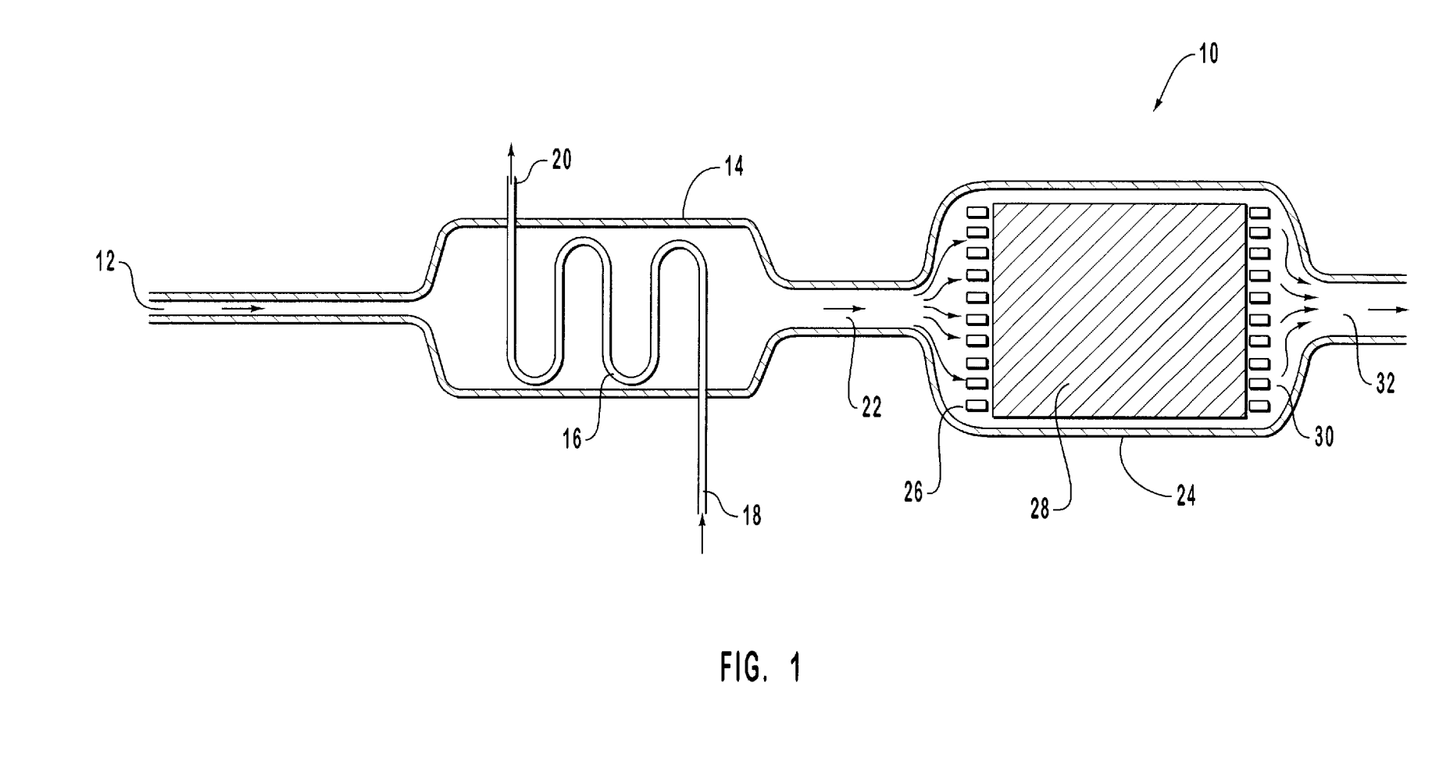
FIG. 1 illustrates an apparatus according to one embodiment of the invention for adjusting the temperature of a gas stream containing carbon monoxide and hydrogen gas, and selectively oxidizing the carbon monoxide.

Referring now to FIG. 1, one embodiment is shown of an apparatus that may be used to selectively oxidize carbon monoxide in a hydrogen-containing gas mixture without substantially oxidizing the hydrogen. Thus, FIG. 1 shows a thermally selective oxidation apparatus 10. A gas mixture containing carbon monoxide and hydrogen gas is delivered to apparatus 10 through a conveyance 12 such as a pipe with a tubular channel. The gas mixture is passed to a heat exchange 14 which is in fluid communication with conveyance 12. In heat exchanger 14, the temperature of the gas mixture is adjusted to a desired temperature by thermal contact with a heat transfer device 16 disposed within heat exchanger 14. The temperature of the heat transfer device 16 is regulated by passage of a fluid through heat transfer device 16, the fluid entering heat exchanger 14 through a conveyance 18, and exiting through a conveyance 20.

The gas mixture, now cooled or heated to a desired temperature, passes through a conveyance 22 into a reactor 24 such as a packed bed reactor. The gas mixture initially passes through a first flow distributor 26 which can be a perforated plate or other device that acts both to retain an oxygen transfer catalyst 28 and to evenly distribute the flow of gas into oxygen transfer catalyst 28. The oxygen transfer catalyst is initially provided in the oxidized state. As the gas mixture passes through oxygen transfer catalyst 28, the carbon monoxide contained in the gas mixture is oxidized to produce carbon dioxide, and oxygen transfer catalyst 28 is reduced to the reduced state. As the gas mixture leaves oxygen transfer catalyst 28, it passes through a second flow distributor 30, which may be essentially identical to first flow distributor 26. The gas mixture, now essentially depleted of carbon monoxide, passes through a conveyance 32 and exits the system.

As the cumulative amount of carbon monoxide passed through reactor 24 approaches a stoichiometric equivalent with respect to oxygen transfer catalyst 28, oxygen transfer catalyst 28 becomes depleted. It is then necessary to stop the flow of the gas mixture to the system and regenerate oxygen transfer catalyst 28 by passing an oxygen-containing gas through apparatus 10. If desired, apparatus 10 can first be purged with a non-reactive gas such as nitrogen, argon or steam.

Figure 2:
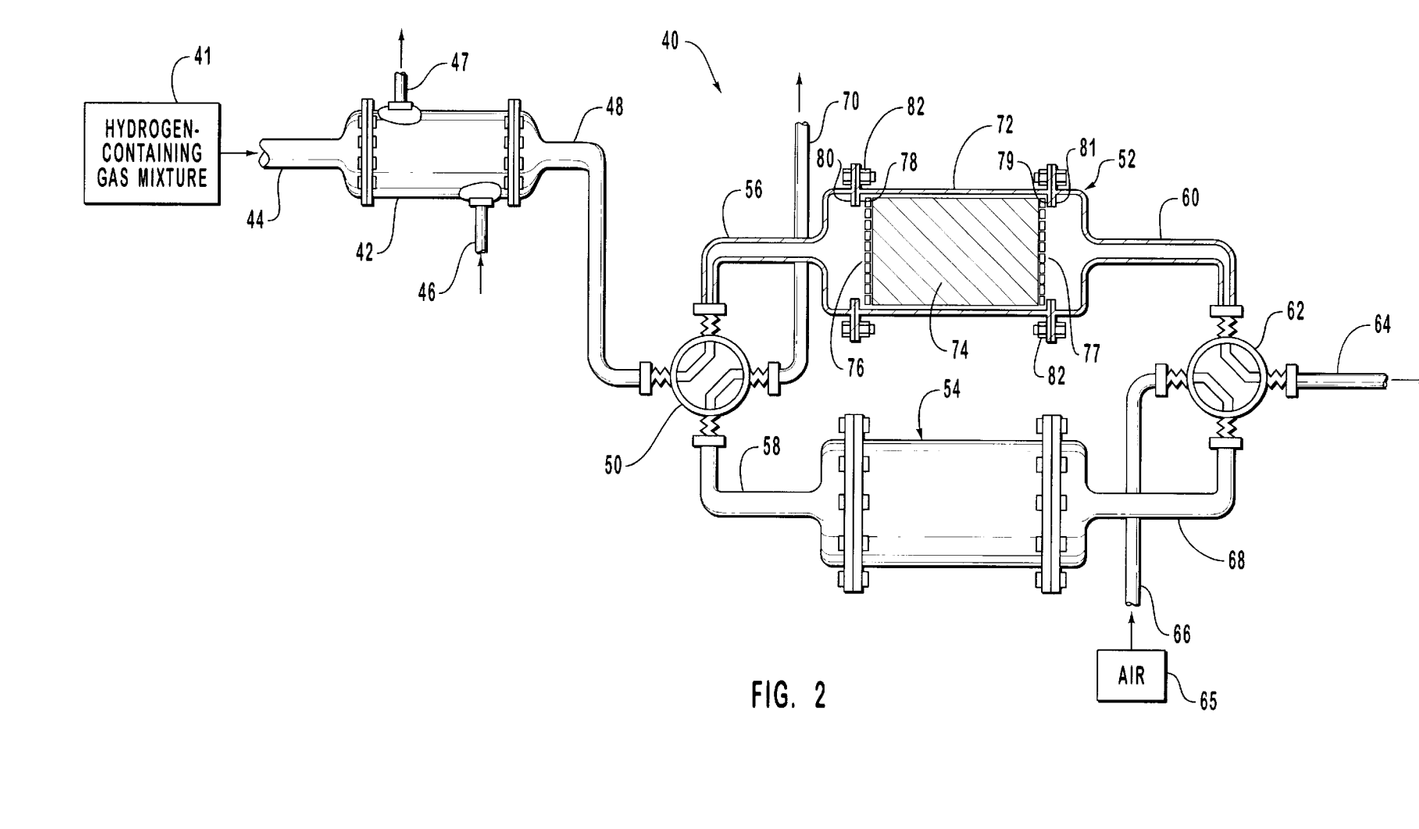
FIG. 2 illustrates a system according to another embodiment of the invention which continuously processes a hydrogen gas mixture by selectively oxidizing carbon monoxide.

The steps of alternately reducing and regenerating the oxygen transfer catalyst can be performed discontinuously, as discussed above in reference to FIG. 1, or continuously. FIG. 2 illustrate a selective oxidation system 40 for continuous processing of a hydrogen-containing gas mixture according to another embodiment of the invention. A source 41 of a hydrogen-containing gas mixture is in fluid communication with a heat exchanger 42 through a conveyance 44 such as a pipe. Heat transfer in heat exchanger 42 is effected by thermal contact with a heat transfer device in which a fluid enters through a conveyance 46 and exits through a conveyance 47. The heat exchanger 42 can be substantially the same as heat exchanger 14 shown in more detail in FIG. 1.

Returning to FIG. 2, the gas mixture, now heated or cooled to a desired temperature, exits head exchanger 42 through a conveyance 48 and passes to a first four-way valve 50. The four-way valve 50 may direct the gas mixture either to a first reactor 52 or a second reactor 54, via a conveyance 56 or a conveyance 58, depending upon the arrangement of four-way valve 50. The first reactor 52 and the second reactor 54 can be of essentially the same construction. For illustrative purposes, first reactor 52 is shown in cut-away view, while second reactor 54 is shown enclosed. In the configuration shown in FIG. 2, four-way valve 50 is arranged to direct the gas mixture through conveyance 56 to first reactor 52 for oxidation of CO. The gas mixture exits first reactor 52 through a conveyance 60 and encounters a second four-way valve 62, which directs the gas mixture to a conveyance 64, through which the gas mixture exits system 40.

A source 65 of an oxygen-containing gas such as air is in fluid communication with reactors 52 and 54 through a conveyance 66 operatively connected to four-way valve 62. The air is directed to a conveyance 68 for passage to second reactor 54 to reoxidize the catalyst therein in a reduced state. As the air exits second reactor 54 via conveyance 58, the air encounters four-way valve 50, which directs the air through a conveyance 70 to exit system 40.

As noted above, first and second reactors 52 and 54 in FIG. 2 can be essentially the same. Using first reactor 52 for illustrative purposes, first reactor 52 includes an external shell 72 which encloses an oxygen transfer catalyst 74. The oxygen transfer catalyst 74 is held in place by a pair of opposing flow straighteners 76 and 77. The flow straighteners 76 and 77 are in turn held in place by a pair of opposing retaining rings 78 and 79, which are supported by a pair of flanges 80 and 81 held in place by a plurality of bolt connections 82 made with outer shell 72.

Operation of the system shown in FIG. 2 is discussed in more detail as follows. A hydrogen-containing gas mixture having a carbon monoxide impurity is directed to heat exchanger 42, where the gas mixture reaches a desired temperature through exchange of heat with a heat transfer fluid entering heat exchanger 42 through conveyance 46, and leaving through conveyance 48. After a desired temperature has been reached, the gas mixture is directed through conveyance 48 to four-way valve 50, which may direct the gas mixture to either first reactor 52 or second reactor 54. As shown in FIG. 2, four-way valve 50 is configured to direct the gas mixture to first reactor 52. When the gas mixture enters first reactor 52, it encounters flow straightener 76, which serves to distribute the flow of the gas mixture evenly across the surface of oxygen transfer catalyst 74. At least a portion, and preferably substantially all, of oxygen transfer catalyst 74 is initially in the oxidized state. Carbon monoxide in the gas mixture contacts oxygen transfer catalyst 74, and is oxidized to carbon dioxide. The gas mixture, now essentially depleted of carbon monoxide, exits oxygen transfer catalyst 74 by passing through flow straightener 77 to conveyance 60. The gas mixture then flows to four-way valve 62, and is directed out of system 40 to be used as desired.

At the same time that the gas mixture is passing through first reactor 52, an oxygen-containing gas, preferably air, is supplied to the system via conveyance 66. The oxygen-containing gas can be supplied at any convenient temperature, such as room temperature. The oxygen-containing gas encounters four-way valve 62, which directs the oxygen-containing gas to second reactor 54. Keeping in mind that first and second reactors 52 and 54 are essentially the same, second reactor 54 also includes all of the components described above in reference to first reactor 52. Thus, as the oxygen-containing gas passes through second reactor 54, the flow of the gas is distributed by flow straighteners evenly across the surface of an oxygen transfer catalyst contained within second reactor 54. At least a portion, and preferable substantially all, of the oxygen transfer catalyst in second reactor 54 is initially provided in the reduced state. As the oxygen-containing gas contacts the oxygen transfer catalyst in the reduced state, the oxygen transfer catalyst is oxidized to the oxidized state. Any unreacted remainder of the oxygen-containing gas exits second reactor 54 through conveyance 58, and is directed by four-way valve 50 to exit system 40 through conveyance 70.

Thus, a hydrogen-containing gas mixture with a carbon monoxide impurity is purified by selective oxidation of the carbon monoxide in reactor 52 by contact with an oxygen transfer catalyst in the oxidized state. At the same time, in second reactor 54, an oxygen transfer catalyst in the reduced state is regenerated (reoxidized) to the oxidized state by contact with an oxygen-containing gas. It is a particular feature of the present invention that first and second reactors 52 and 54 are essentially the same, and four-way valves 50 and 62 can be switched to change the flow of gases in the system. Further, there is no preference in the conveyances or reactors of the system for a particular direction of gas flow; i.e., gases can be switched to change the flow of gases in the system. Further, there is no preference 60, or can be directed in the other direction, from conveyance 60 through first reactor 52 to conveyance 56. It should be apparent that the same relationship holds for the direction of flow through second reactor 54.

Because of this high degree of symmetry, system 40, can be operated in a substantially continuous mode. Thus, for example, while a hydrogen-containing gas mixture is purified in the first reactor, the oxygen transfer catalyst is reoxidized in the second reactor. When the oxygen transfer catalyst in the first reactor becomes depleted, i.e., a substantial amount of the oxygen transfer catalyst has been reduced to the reduced state, each four-way valve can be switched, so that the flow of the hydrogen-containing gas is redirected to the second reactor, which now contains a regenerated oxygen transfer catalyst, and the flow of oxygen-containing gas is redirected to the first reactor, where it reoxidizes the depleted oxygen containing catalyst.

The process of reoxidizing the oxygen transfer catalyst described above includes contacting the oxygen transfer catalyst with an oxygen-containing gas, such as air. If desired, the oxygen transfer catalyst can be contacted with a non-reactive gas either before, after, or both before and after, contacting it with the oxygen-containing gas. This flow of non-reactive gas serves to purge the reactor of any residual hydrogen-containing gas, preventing contact between the hydrogen-containing gas and the air. The non-reactive gas can be any gas or gas mixture that does not react with the oxygen transfer catalyst, such as nitrogen, argon, steam, etc. A preferred non-reactive gas is steam.

If this purging step is not performed, then it is advantageous to avoid contact between the hydrogen-containing gas mixture and the oxygen-containing gas by stopping the supply of oxygen-containing gas to the reactor in which catalyst reoxidation is taking place before the regeneration of the oxygen transfer catalyst is complete. In this situation, the air coming out of the reactor is strongly depleted of oxygen. Thus, when the hydrogen-containing gas starts to flow through the reactor it will not contact oxygen-containing air, but rather air from which the oxygen has been removed.

The reaction between oxygen and the oxygen transfer catalyst is highly exothermic. This exothermicity results in substantial heating of both the oxygen-containing gas and the oxygen transfer catalyst, and may heat the oxygen transfer catalyst to a temperature greater than the preferred temperature for the selective oxidation of carbon monoxide in the presence of hydrogen. While such overheating is a severe problem in the prior art, it is not a problem in the present invention, since it occurs in the absence of the hydrogen-containing gas. The oxygen transfer catalyst may be cooled to the preferred operating temperature by any of a variety of cooling means known in the art, such as purging the catalyst with a flow of steam, with the flow of steam being at the desired lower temperature, before the flow of the hydrogen-containing gas is restarted.

Air exciting system 40 via conveyance 70 may be directed to other uses and may be a source of useful heat.

The following examples are provided to more fully describe particular aspects of the invention. These examples are intended to be purely illustrative, and should not be viewed as limiting the scope of the present invention which is defined by the appended claims.

EXAMPLE 1

Figure 3:
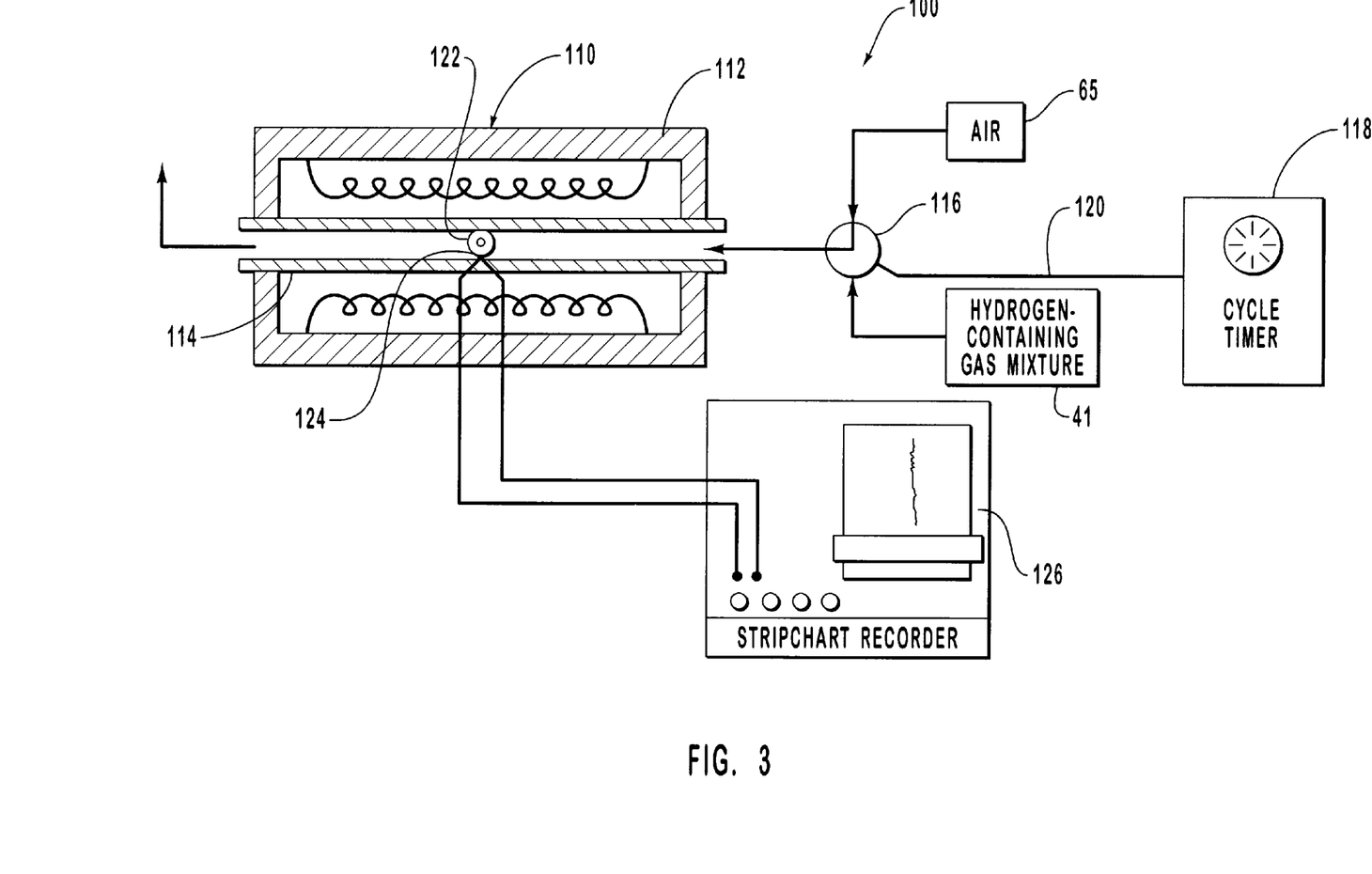
FIG. 3 illustrates a laboratory apparatus for demonstrating important aspects of the present invention, in which a hydrogen gas mixture is contacted with an oxygen transfer catalyst attached to a thermocouple suspended in an electric oven.

The system shown in FIG. 3 was used to demonstrate, on a laboratory scale, certain features of the present invention. Referring to FIG. 3, a system 100 is shown. In this experimental arrangement, a reactor 110 includes an electric tube furnace 112 containing a quartz tube 114. Air and a fuel (either hydrogen or carbon monoxide) are supplied to quartz tube 114 by a three-way valve 116. The three-way valve 116 is configured to admit either air only or the fuel only, to quartz tube 114. The three-way valve 116 is controlled by a cycle timer 118, which sends a signal via a wire 120 indicating whether three-way valve 116 should admit the fuel or air to quartz tube 114. An alumina ring 122 is impregnated with the oxygen transfer catalyst, and cemented onto the end of a thermocoule 124. The thermocouple 124 is placed inside quartz tube 114 in electric furnace 112. The signal from thermocouple 124 is directed to a readout device such as a strip chart recorder 126.

At the start of the experiment, the catalyst was in an oxidized state, and cycle timer 118 was turned on. Air and the fuel were alternately directed through three-way valve 116 into quartz tube 114. The tube furnace 112 was turned on, with the temperature measured by thermocouple 124 and monitored by strip chart recorder 126. Initially, the temperature rose at a rate corresponding to the rate of heating of the furnace, i.e., the temperature rose slowly. When the fuel and air passing alternately over the catalyst began to reduce and oxidize it, the temperature began to increase at a rapid rate. The temperature at which this rapid temperature increase occurs is the ignition temperature for a given fuel and oxygen transfer catalyst, as measured in this system. The experiment was performed on several fuel/catalyst systems.

Table 1 illustrates the results of these tests.

TABLE 1

Ignition Temperatures of CO and $H_2$

| Metal/Oxide | Fuel | Ignition Temperature | |
|---|---|---|---|
| | | °C. | °F. |
| Fe/FeO | Carbon Monoxide | 295 | 563 |
| Ni/NiO | Carbon Monoxide | 265 | 509 |
| Ag/$Ag_2$O | Carbon Monoxide | 153 | 307 |
| Cu/CuO | Carbon Monoxide | 172 | 342 |
| Cu/CuO | Hydrogen | 184 | 364 |

The temperatures shown in the Table are useful for illustrative purposes, but as described above, do not accurately represent the gas temperature, and are strongly dependent upon the specific method of measuring temperature. However, the data shown in Table 1 do indicate that each of the oxygen transfer catalysts tested will react to oxidize carbon monoxide. The temperature at which each catalyst system "ignites" is thus readily determined.

Table 1 further illustrates the selectivity for oxidation of CO over $H_2$ when the oxygen transfer catalyst is copper/copper oxide. Although Table 1 shows that both hydrogen and carbon monoxide will react with copper oxide, there is a measured difference in the temperatures at which each will "ignite". This difference in ignition temperatures is exploited in the present invention to provide a method for the selective oxidation of carbon monoxide in a hydrogen-containing gas mixture without substantially oxidizing the hydrogen.

EXAMPLE 2

In order to illustrate the selectivity of carbon monoxide oxidation in the presence of hydrogen, a second experiment was performed. The experimental apparatus is conventional, and is not shown. A tubular reactor 1.25 cm in diameter was filled with inert ceramic pellets and a commercial copper oxide catalyst (Englehard) on 2.5 mm pellets. The tubular reactor was placed inside a vertical tube furnace, and a mixture of carbon monoxide (2970 ppm), nitrogen (3%) and the balance hydrogen was delivered to the reactor at a gas hourly space velocity of 6200 v/v/hr. Gases exiting the reactor first passed through a cold finger trap to observe the formation of any moisture, which would indicate oxidation of hydrogen gas, and then to a non-dispersive infrared carbon monoxide analyzer. A thermocouple placed in the catalyst bed provided an indication of temperature during the experiment. The electric furnace was turned on, and the carbon monoxide concentration was monitored as a function of the temperature of the thermocouple in the reactor.

The results of the experiment are shown in Table 2.

TABLE 2

Selective Oxidation of CO in the Presence of $H_2$

| Temperature (° C.) | [CO] (ppm) | Water Observed? |
|---|---|---|
| ambient | 2970 | No |
| 41 | 2100 | No |
| 50 | 1720 | No |
| 60 | 1250 | No |
| 65 | 1220 | No |
| 70 | 1050 | No |
| 79 | 870 | No |
| 81 | 850 | Yes |

As the data in Table 2 indicate, carbon monoxide oxidation was observed at temperature as low as 41° C. The effectiveness of carbon monoxide oxidation continued to increase with temperature. At a temperature of 81° C., where the carbon monoxide concentration had reached 850 ppm, moisture was observed in the cold finger. These results indicate the selective oxidation of carbon monoxide in the presence of hydrogen gas.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of selectively oxidizing carbon monoxide in a hydrogen-containing gas mixture, comprising the steps of:
   providing a gas mixture comprising hydrogen gas and carbon monoxide;
   providing an oxygen transfer catalyst having an oxidized state and a reduced state, the oxygen transfer catalyst in the oxidized/reduced state selected from the group consisting of silver oxide/silver, higher oxides of cerium/lower oxides of cerium, and combinations or mixtures thereof; and
   alternately performing the steps of:
      contacting the gas mixture with the oxygen transfer catalyst in the oxidized state at a temperature range at which the hydrogen gas is not substantially oxidized by the oxygen transfer catalyst, such that at least a portion of the carbon monoxide in the gas mixture is oxidized to carbon dioxide, and at least a portion of the oxygen transfer catalyst in the oxidized state is reduced to the reduced state; and
      reoxidizing the oxygen transfer catalyst in the reduced state to the oxidized state.

2. The method of claim 1, wherein the gas mixture comprises at least about 20% by volume hydrogen gas, and less than about 5% by volume carbon monoxide.

3. The method of claim 1, wherein the gas mixture comprises at least about 50% by volume hydrogen gas, and less than about 2% by volume carbon monoxide.

4. The method of claim 1, wherein the gas mixture comprises at least about 80% by volume hydrogen gas, and less than about 0.5% by volume carbon monoxide.

5. The method of claim 1, wherein the step of contacting the gas mixture with the oxygen transfer catalyst in the oxidized state is carried out at a pressure of about 1 to about 10 atm.

6. The method of claim 1, wherein the step of reoxidizing the oxygen transfer catalyst is carried out by contacting the oxygen transfer catalyst in the reduced state with an oxygen-containing gas.

7. The method of claim 6, wherein the oxygen-containing gas is air.

8. The method of claim 1, wherein the temperature range is maintained by a heat exchanger upstream from the oxygen transfer catalyst.

9. A method of selectively oxidizing carbon monoxide in a hydrogen-containing gas mixture, comprising the steps of:
   directing a first gas mixture comprising hydrogen gas and carbon monoxide into a heat exchanger;
   directing the first gas mixture from the heat exchanger to a first reactor containing a first oxygen transfer catalyst in an oxidized state;
   passing the first gas mixture over the first catalyst in the oxidized state so that at least a portion of the carbon monoxide in the first gas mixture is oxidized to carbon dioxide, and at least a portion of the first catalyst is reduced to a reduced state;
   directing an oxygen-containing gas into a second reactor containing a second oxygen transfer catalyst in a reduced state;
   passing the oxygen-containing gas over the second catalyst in the reduced state so that at least a portion of the second catalyst is oxidized to an oxidized state;
   redirecting a second gas mixture comprising hydrogen gas and carbon monoxide from the heat exchanger to the second reactor containing the second catalyst in the oxidized state
   passing the second gas mixture over the second catalyst in the oxidized state so that at least a portion of the carbon monoxide in the second gas mixture is oxidized to carbon dioxide, and at least a portion of the second catalyst is reduced to the reduced state;
   directing an oxygen-containing gas into the first reactor containing the first catalyst in the reduced state; and
   passing the oxygen-containing gas in the first reactor over the first catalyst in the reduced state so that at least a portion of the first catalyst is oxidized;
   wherein the steps of passing the first gas mixture over the first catalyst and passing the second gas mixture over the second catalyst are carried out at a temperature range at which the hydrogen gas is not substantially oxidized by the first catalyst or the second catalyst, and wherein the first catalyst in the oxidized/reduced state and the second catalyst in the oxidized/reduced state are each selected from the group consisting of silver oxide/silver, higher oxides of cerium/lower oxides of cerium, and combinations or mixtures thereof.

10. The method of claim 9, wherein the gas mixture comprises at least about 20% by volume hydrogen gas, and less than about 5% by volume carbon monoxide.

11. The method of claim 9, wherein the temperature range is maintained by a heat exchanger in contact with the first and second gas mixtures upstream from the first and the second reactors.

12. An apparatus for the selective oxidation of carbon monoxide in a hydrogen-containing gas mixture, comprising:
   means for contacting a gas mixture comprising hydrogen gas and carbon monoxide with an oxygen transfer catalyst in an oxidized state such that at least a portion of the carbon monoxide in the gas mixture is oxidized to carbon dioxide without substantial oxidation of the hydrogen gas, and at least a portion of the oxygen transfer catalyst in the oxidized state is reduced to a reduced state;
   means for maintaining the temperature of the gas mixture and oxygen transfer catalyst at a temperature range at which the hydrogen gas is not substantially oxidized by the oxygen transfer catalyst; and
   means for reoxidizing the oxygen transfer catalyst in the reduced state to the oxidized state, the oxygen transfer catalyst in the oxidized/reduced state selected from the group consisting of silver oxide/silver, higher oxides of cerium/lower oxides of cerium, and combinations or mixtures thereof.

13. The apparatus of claim 12, wherein the means for maintaining the temperature comprises a heat exchanger in communication with oxygen transfer catalyst.

14. A system for selectively oxidizing carbon monoxide in a hydrogen-containing gas mixture, comprising:
   a source of a hydrogen-containing gas mixture;
   a heat exchanger in fluid communication with the source of the hydrogen-containing gas mixture;
   a first reactor in fluid communication with the heat exchanger, the first reactor containing a first oxygen transfer catalyst having an oxidized state and a reduced state;
   a second reactor in fluid communication with the heat exchanger, the second reactor containing a second oxygen transfer catalyst having an oxidized state and a reduced state; and
   a source of an oxygen-containing gas in fluid communication with the first and second reactors;
   wherein when the first catalyst is in the oxidized state in the first reactor, the first catalyst is capable of oxidizing carbon monoxide in the gas mixture in contact with the first catalyst, while the second catalyst in the reduced state in the second reactor is being oxidized by the oxygen-containing gas, and when the second catalyst is in the oxidized state, the second catalyst is capable of oxidizing carbon monoxide in the gas mixture in contact with the second catalyst, while the first catalyst in the reduced state is being oxidized by the oxygen-containing gas, and wherein the first catalyst in the oxidized/reduced state and the second catalyst in the oxidized/reduced state are each selected from the group consisting of silver oxide/silver, higher oxides of cerium/lower oxides of cerium, and combinations or mixtures thereof, and wherein the heat exchanger regulates the temperature of the gas mixture before it enters the first reactor or the second reactor, the temperature of the gas mixture having a temperature range at which hydrogen gas in the gas mixture is not substantially oxidized by the first or second catalysts.

15. The system of claim 14, wherein the gas mixture comprises at least about 20% by volume hydrogen gas, and less than about 5% by volume carbon monoxide.

16. A method of selectively oxidizing carbon monoxide in a hydrogen-containing gas mixture, comprising the steps of:
   providing a gas mixture comprising hydrogen gas and carbon monoxide;
   providing an oxygen transfer catalyst having an oxidized state and a reduced state, the oxygen transfer catalyst in the oxidized/reduced state comprising copper oxide/copper; and
   alternately performing the steps of:
      contacting the gas mixture with the oxygen transfer catalyst in the oxidized state at a temperature of about 172° C. or about 184° C., such that at least a portion of the carbon monoxide in the gas mixture is oxidized to carbon dioxide, and at least a portion of the oxygen transfer catalyst in the oxidized state is reduced to the reduced state; and reoxidizing the oxygen transfer catalyst in the reduced state to the oxidized state.

17. The method of claim 16, wherein the step of reoxidizing the oxygen transfer catalyst is carried out by contacting the oxygen transfer catalyst in the reduced state with an oxygen-containing gas.

18. A method of selectively oxidizing carbon monoxide in a hydrogen-containing gas mixture, comprising the steps of:

providing a gas mixture comprising hydrogen gas and carbon monoxide;

providing an oxygen transfer catalyst having an oxidized state and a reduced state, the oxygen transfer catalyst in the oxidized/reduced state comprising silver oxide/silver; and alternately performing the steps of:
contacting the gas mixture with the oxygen transfer catalyst in the oxidized state such that at least a portion of the carbon monoxide in the gas mixture is oxidized to carbon dioxide, and at least a portion of the oxygen transfer catalyst in the oxidized state is reduced to the reduced state; and reoxidizing the oxygen transfer catalyst in the reduced state to the oxidized state.

19. The method of claim 18, wherein the step of contacting the gas mixture with the oxygen transfer catalyst in the oxidized state is carried out at a pressure of about 1 to about 10 atm.

20. The method of claim 18, wherein the step of contacting the gas mixture with the oxygen transfer catalyst in the oxidized state is carried out at a temperature at which the hydrogen gas is not substantially oxidized by the oxygen transfer catalyst.

21. The method of claim 18, wherein the step of reoxidizing the oxygen transfer catalyst is carried out by contacting the oxygen transfer catalyst in the reduced state with an oxygen-containing gas.

22. A method of selectively oxidizing carbon monoxide in a hydrogen-containing gas mixture, comprising the steps of:

directing a first gas mixture comprising at least about 80% by volume hydrogen gas and less than about 0.5% by volume carbon monoxide into a heat exchanger;

directing the first gas mixture from the heat exchanger to a first reactor containing a first oxygen transfer catalyst in an oxidized state;

passing the first gas mixture over the first catalyst in the oxidized state so that at least a portion of the carbon monoxide in the first gas mixture is oxidized to carbon dioxide, and at least a portion of the first catalyst is reduced to a reduced state;

directing an oxygen-containing gas into a second reactor containing a second oxygen transfer catalyst in a reduced state;

passing the oxygen-containing gas over the second catalyst in the reduced state so that at least a portion of the second catalyst is oxidized to an oxidized state;

redirecting a second gas mixture comprising hydrogen gas and carbon monoxide from the heat exchanger to the second reactor containing the second catalyst in the oxidized state;

passing the second gas mixture over the second catalyst in the oxidized state so that at least a portion of the carbon monoxide in the second gas mixture is oxidized to carbon dioxide, and at least a portion of the second catalyst is reduced to the reduced state;

directing an oxygen-containing gas in the the first reactor containing the first catalyst in the reduced state; and passing the oxygen-containing gas in the first reactor over the first catalyst in the reduced state so that at least a portion of the first catalyst is oxidized;

wherein the step of passing the first gas mixture over the first catalyst and passing the second gas mixture over the second catalyst are carried out at a temperature range at which the hydrogen gas is not substantially oxidized by the first catalyst of the second catalyst, and wherein the first catalyst in the oxidized/reduced state and the second catalyst in the oxidized/reduced state each comprise silver oxide/silver.

\* \* \* \* \*

UNITED STATES PATENT AND TRADEMARK OFFICE
CERTIFICATE OF CORRECTION

PATENT NO. : 6,475,454 B1
DATED : November 5, 2002
INVENTOR(S) : Jerald A. Cole and Richard K. Lyon It is certified that error appears in the above-identified patent and that said Letters Patent is hereby corrected as shown below:

Title page,
Item [56], U.S. PATENT DOCUMENTS,
Delete "3,886,481 A 5/1975 Foster ……. 330/4.3"

Column 5,
Line 36, change "amass" to -- a mass --
Line 48, change "i e." to -- i.e., --

Column 6,
Line 10, change "1%," to -- 0.1%, --
Line 67, change "o$_2$" to -- O$_2$ --

Column 8,
Line 29, after "172º C." insert -- to about 184º C. --

Column 9,
Line 46, change "exchange" to -- exchanger --
Line 61, after "catalyst" insert -- 28 --

Column 10,
Line 16, change "illustrate" to -- illustrates --

Column 11,
Lines 54-55, change "switched to change the flow of gases in the system. Further, there is no preference" to -- directed in the direction of from conveyance 56 through first reactor 52 to conveyance --
Line 60, change "40." to -- 40 --

Column 12,
Line 45, change "exciting" to -- exiting --

Column 14,
Line 19, change "temperature" to -- temperatures --

UNITED STATES PATENT AND TRADEMARK OFFICE
CERTIFICATE OF CORRECTION

PATENT NO.     : 6,475,454 B1
DATED          : November 5, 2002
INVENTOR(S)    : Jerald A. Cole and Richard K. Lyon It is certified that error appears in the above-identified patent and that said Letters Patent is hereby corrected as shown below:

<u>Column 16,</u>
Line 17, after "with" insert -- the --

<u>Column 18,</u>
Line 30, change "in" to -- into --
Line 35, change "step" to -- steps --
Line 39, change "of" to -- or --

Signed and Sealed this

Twenty-ninth Day of July, 2003

JAMES E. ROGAN
*Director of the United States Patent and Trademark Office*